E. H. WAUGH.
BUSHING.
APPLICATION FILED DEC. 14, 1917.
1,356,101.
Patented Oct. 19, 1920.
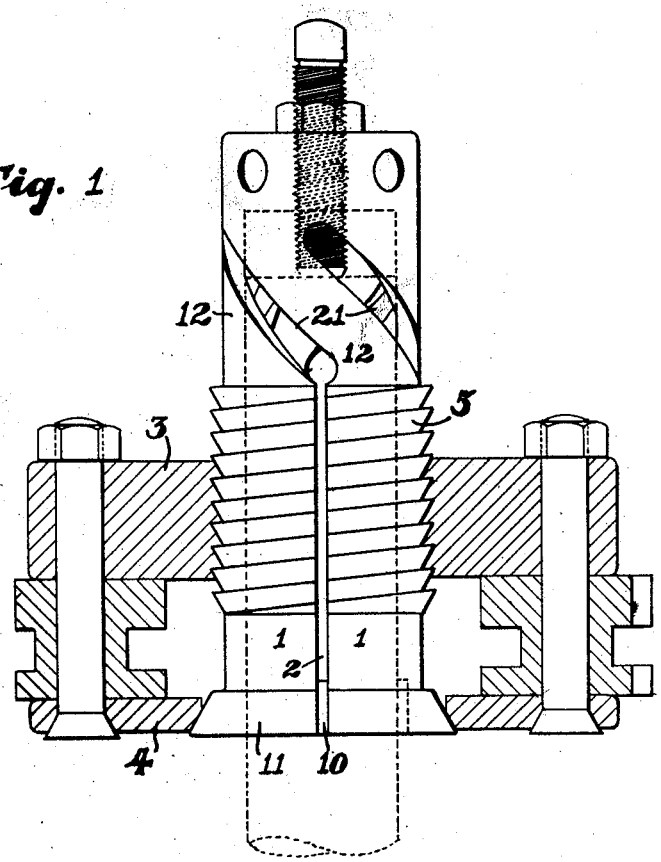
Fig. 1
Fig. 2
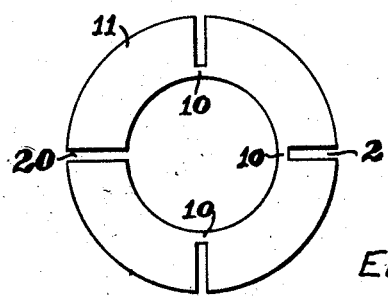
Inventor
EDWARD H. WAUGH.
By Henry L. Reynolds
Attorney

UNITED STATES PATENT OFFICE.

EDWARD H. WAUGH, OF SEATTLE, WASHINGTON, ASSIGNOR TO SMITH CANNERY MACHINES CO., OF SEATTLE, WASHINGTON, A CORPORATION OF WASHINGTON.

BUSHING.

1,356,101.   Specification of Letters Patent.   Patented Oct. 19, 1920.

Application filed December 14, 1917. Serial No. 207,197.

*To all whom it may concern:*

Be it known that I, EDWARD H. WAUGH, a citizen of the United States, and resident of the city of Seattle, county of King, and State of Washington, have invented certain new and useful Improvements in Bushings, of which the following is a specification.

My invention relates to means for securing bodies upon shafts wherein a slitted clamping sleeve is inserted between the shaft and the body to be secured thereto, said sleeve and one of the other parts being provided with engaging threads and also with surfaces which engage to resist relative angular movement, a clamping action being secured by the riding of said parts upon the slope of the threads. My present invention is an improvement upon the device as shown in my former Patent No. 1,229,837, issued June 12, 1917, and comprises the novel constructions which are defined by the claims.

In the drawings I have shown my invention in the form of construction which is now most preferred by me.

Figure 1 is an axial section through the outer body which is to be secured to the shaft and a side view of the clamping sleeve, the shaft being indicated in dotted lines.

Fig. 2 is a face view of the head end of the sleeve.

In using the device shown in my former Patent No. 1,229,837, of June 12, 1917, I have found that its action is imperfect in two respects. Unless the bars formed by the longitudinal slits are made quite thick, being in no way supported or connected except at one end, there is a tendency to twist out of parallelism with the axis of the shaft, or toward helical positions. Where the bars are made thick enough to satisfactorily resist this tendency, they will not spring as they should to take up the looseness in the fitting of the parts.

One of the purposes sought in using this type of securing mechanism is to secure a body tightly upon and accurately concentric with a shaft which may be somewhat smaller in diameter than the maximum which will enter the sleeve. This result is secured by slitting the sleeve into bars which may give radially and by causing the body which is threaded thereon to ride upon the flanks of the threads, thereby powerfully forcing these arms laterally against the other body.

It is evident that the more the arms can spring the greater the range in diameter of shafts it can be secured upon. In the former construction, making these arms light enough to permit their giving enough radially, made them so weak that deformation of a helical character occurred.

To secure a greater radial resiliency together with the ability to resist torsional deformation, I do not entirely sever all of the arms at the head end. One of the slits, 20, is cut entirely through the head 11, but in the others a thin web 10 is left, thus tying this end of the arms 1 together.

This web or tongue 10 is thin enough to permit compression of the sleeve and yet it prevents any lengthwise movement of the sleeve, such as would occur with twisting of the arms.

To secure a greater resiliency at the other end of the sleeve, I continue the extensions 21 of the slots in a helical direction. I may also widen the slots, as has been shown.

The helical arrangement of the slot extensions 21, makes the bars 12 longer and narrower than if they were parallel to the axis of the shaft, thereby increasing their resiliency and their range of movement.

The body illustrated as secured upon the shaft is a cutter head, although it might be some other kind of a body. It is shown as having a plate 4 at one side which has a conical or tapering surface engaging a like surface upon the head 11 of the sleeve, and a plate 3 which is threaded complementary to the threads 5 of the sleeve.

By the change in construction described I secure a greater range of action of the sleeve than can be secured by the type of construction shown in said patent. I have found that although the sleeve may be a very loose fit upon a shaft when first slipped thereon, it will give enough to tightly grip the shaft when the head is turned thereon and also that the head is always held concentric with the shaft.

What I claim as my invention is:

1. A sleeve for use in securing a body about a shaft, having a projecting head at one end adapted to engage the outer body to prevent relative movement lengthwise of its axis, and having a threaded section between its ends, the other end of the sleeve being adapted to project beyond the outer body, said sleeve being slit lengthwise into a plurality of bars, said slits in the portion projecting beyond the outer body extending in helical directions.

2. A sleeve for use in securing a body about a shaft, having a projecting head at one end adapted to engage the outer body to prevent relative movement lengthwise of its axis, and having a threaded section between its ends, the other end of the sleeve being adapted to project beyond the outer body, said sleeve being slit from its head end to near its other end, the slits in that portion which is adapted to project beyond the outer body extending in helical directions.

3. A sleeve for use in securing a body about a shaft, having a projecting head at one end adapted to engage the outer body to prevent relative movement lengthwise of its axis, and having a threaded section between its ends, the other end of the sleeve being adapted to project beyond the outer body, said sleeve being slit from its head end to near its other end, the slits in that portion which is adapted to project beyond the outer body extending in helical directions, and all of said slits but one being bridged at the head end by thin webs.

4. The combination with a shaft member and a member to be secured thereon, of a sleeve having a clamping section with a non-tapered portion interposed between said members and slit to form a plurality of bars, said section of the sleeve and one of the members having threaded engagement, said sleeve also having joined thereto a portion having a surface engaging said member to resist relative axial movement, the sleeve having an end projecting from said member and containing helically-disposed extensions of the above-mentioned slits which stop short of this end of the sleeve.

Signed at Seattle, Washington, this 5th day of December, 1917.

EDWARD H. WAUGH.